(12) United States Patent
Tuyl

(10) Patent No.: US 6,968,002 B2
(45) Date of Patent: Nov. 22, 2005

(54) METHOD AND APPARATUS FOR TIME ALIGNING DATA MODULATORS USING FREQUENCY DOMAIN ANALYSIS OF DETECTED OUTPUT

(75) Inventor: Rory Van Tuyl, Los Altos, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 769 days.

(21) Appl. No.: 09/966,898

(22) Filed: Sep. 28, 2001

(65) Prior Publication Data

US 2003/0063696 A1    Apr. 3, 2003

(51) Int. Cl.$^7$ ............................................. H03K 7/00
(52) U.S. Cl. .................... 375/239; 375/282; 375/361; 398/162; 341/69; 332/112
(58) Field of Search ................ 375/237–239, 375/242, 247, 253, 282, 295, 354, 361, 364, 375/371, 373; 372/25–27; 398/156–159, 398/162; 341/68–71, 143; 370/212–213; 329/312–313; 332/109, 112

(56) References Cited

U.S. PATENT DOCUMENTS

| 5,267,071 A | * | 11/1993 | Little et al. ................. 398/162 |
| 6,163,394 A | | 12/2000 | Webb |
| 2002/0080817 A1 | | 6/2002 | Glingener |

FOREIGN PATENT DOCUMENTS

| EP | 0975104 | | 1/2000 | |
| EP | 0975104 A1 | * | 1/2000 | .......... J04B 10/155 |

* cited by examiner

*Primary Examiner*—Young T. Tse
*Assistant Examiner*—Edith Chang

(57) ABSTRACT

Method and apparatus for time aligning first and second signals. The second signal is modulated by the first signal to provide a third signal. Frequency components of the third signal are then determined, the frequency components being indicative of time alignment between the first and second signals. The method and apparatus is particularly suitable for converting a Non-Return-to-Zero data signal to a Return-to-Zero data signal by modulating the Non-Return-to-Zero data signal with a Return-to-Zero pulse signal. The method and apparatus provides for the Non-Return-to-Zero data signal and the Return-to-Zero pulse signal being correctly time aligned in an automated manner without human intervention.

7 Claims, 3 Drawing Sheets

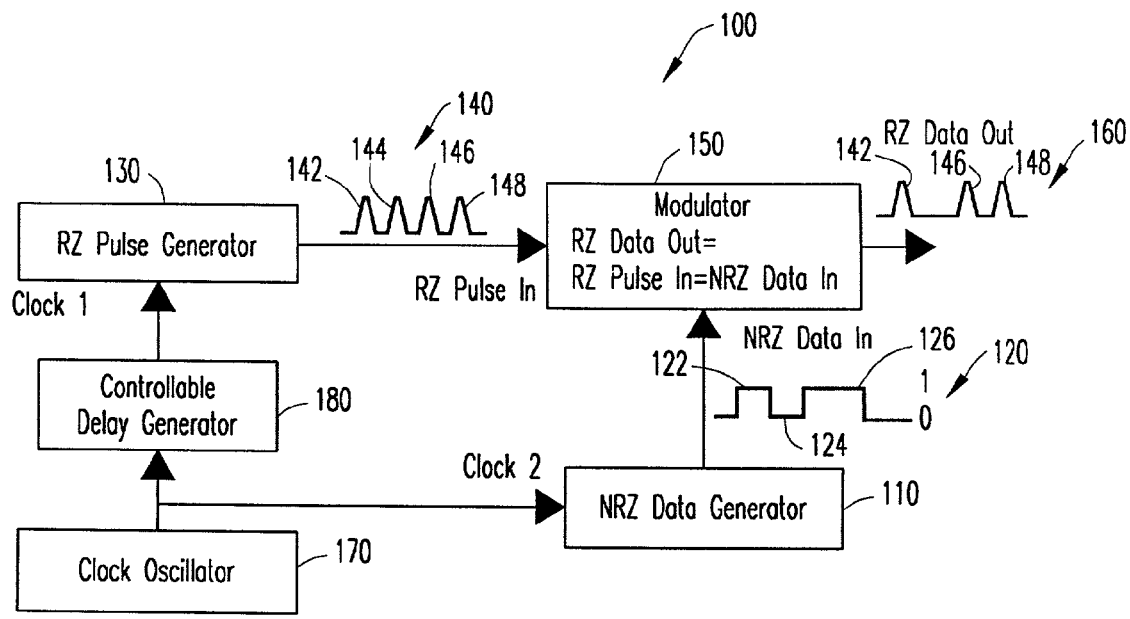
FIG. 1
(PRIOR ART)
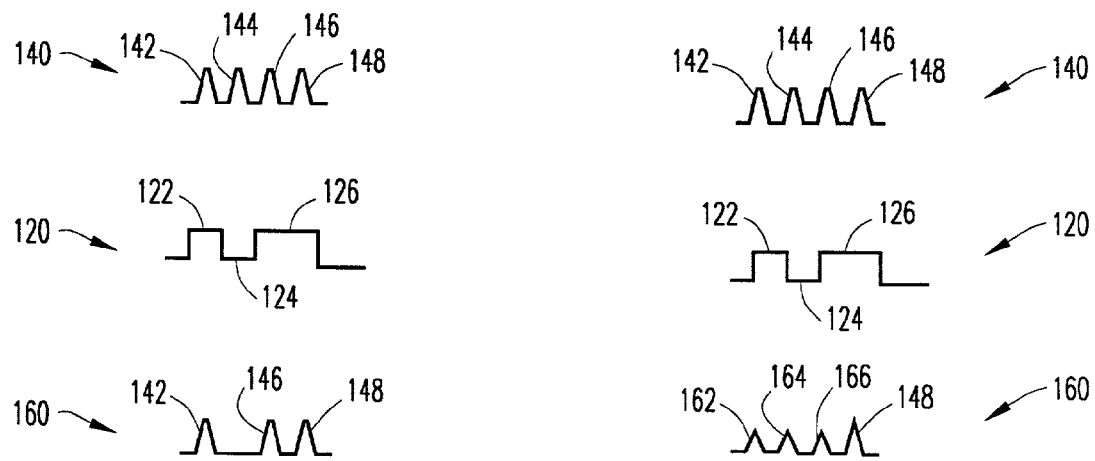
FIG. 2
(PRIOR ART)
FIG. 3
(PRIOR ART)

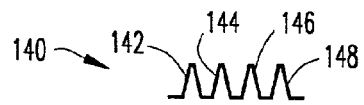
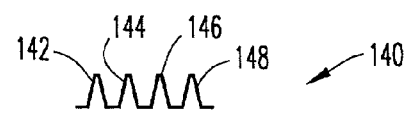
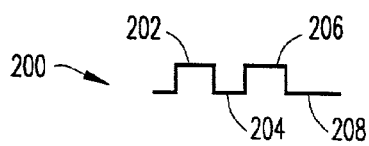
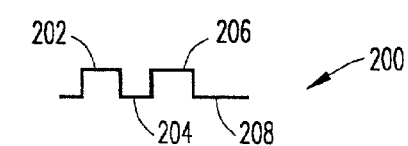
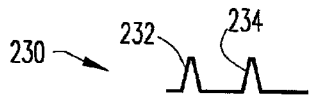
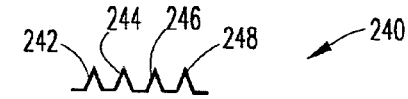
*FIG. 4*　　　　　　　　*FIG. 5*
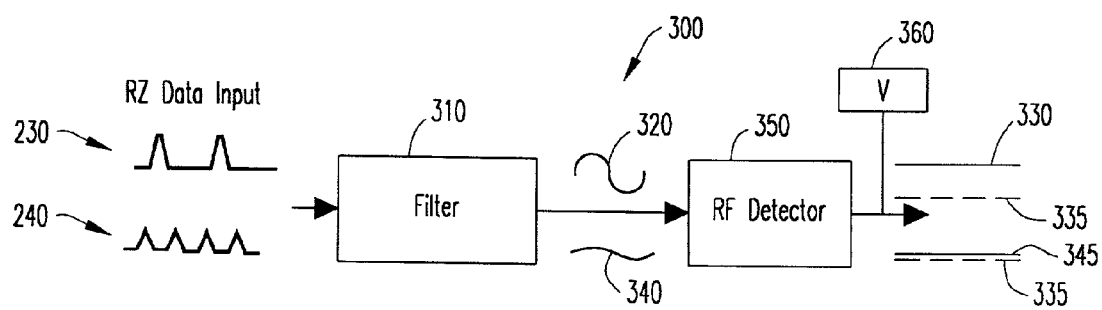
*FIG. 6*
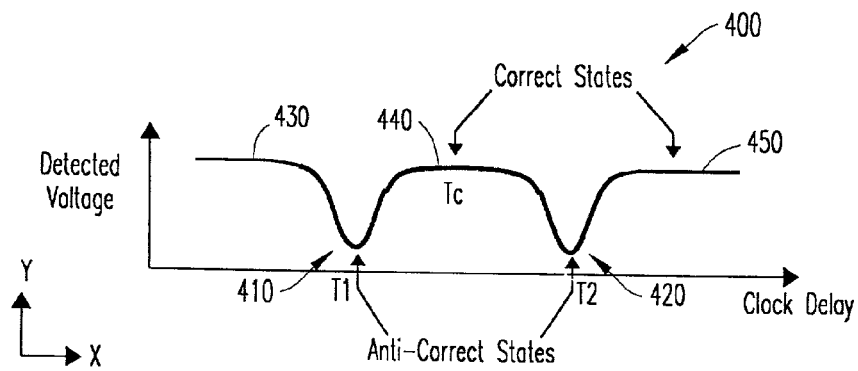
*FIG. 7*

METHOD AND APPARATUS FOR TIME ALIGNING DATA MODULATORS USING FREQUENCY DOMAIN ANALYSIS OF DETECTED OUTPUT

BACKGROUND OF THE INVENTION

1. Technical Field of the Invention

The present invention relates generally to the data transmission field; and, more particularly, to a method and apparatus for time-aligning first and second digital signals.

2. Description of Related Art

The effective transmission of digital data requires that the data be encoded in such a manner that a pulse that is at a logic state 1 and a pulse that is at a logic state 0 can be reliably detected and distinguished from one another. One type of encoding that is often used in optical communications systems is known as Non-Return-to-Zero (NRZ) encoding. In NRZ encoding, data is encoded in an optical signal in a manner that logic state 1 and logic state 0 are represented by different light intensity levels, each of which are constant during a bit duration. A high light intensity level during a bit duration represents logic state 1 and a low light intensity level during a bit duration represents logic state 0. NRZ encoding is desirable in many optical applications because it provides an efficient use of system bandwidth.

An NRZ encoded optical signal, however, is not always fully satisfactory. For example, when NRZ encoded optical signals are transmitted through an optical fiber, signal degradation can occur as a result of a spreading out of the light pulses, particularly when the optical fiber is long. As a result, it has become a common practice in the optical data transmission field to convert digital data encoded in an NRZ signal format to data encoded in a Return-to-Zero (RZ) signal format prior to transmitting the data through an optical fiber or for other purposes.

In an RZ encoded optical signal, logic state 1 is represented by a pulse that increases from zero to a maximum intensity during the first half of a bit duration and returns to zero during the second half of the bit duration. Logic state 0 is represented by the absence of a pulse during an entire bit duration. An RZ encoded optical signal is often more effective in transmitting data through long lengths of optical fiber or other optical transmission paths, as well as in other applications.

FIG. 1, is a block diagram that schematically illustrates a known apparatus for converting a data signal in which data is encoded in an NRZ signal format to a data signal in which the data is encoded in an RZ signal format. The apparatus is generally designated by reference number 100 and includes an NRZ data generator 110 that provides an NRZ encoded data signal, such as the exemplary NRZ encoded data signal 120, at an output thereof. As shown in FIG. 1, the NRZ encoded data signal 120 comprises a waveform that is high when the logic state is 1 and is low when the logic state is 0. Data is encoded in the signal 120 as a stream of data bits of predetermined bit duration. Thus, exemplary NRZ encoded data signal 120 includes a data portion 122 in which the signal is at logic state 1 for one bit duration, a data portion 124 in which the signal is at logic state 0 for one bit duration, and a data portion 126 in which the signal is at logic state 1 for two bit durations. The data signal 120 illustrated in FIG. 1 thus represents the binary data pattern "1011".

Apparatus 100 also includes an RZ pulse generator 130 that generates a signal 140 comprised of a stream of RZ pulses. In FIG. 1, the RZ pulse signal 140 includes four RZ pulses 142, 144, 146 and 148. Signal 140 has a predetermined frequency that corresponds to the data rate of the data signal 120, i.e., an RZ pulse is generated corresponding to each bit duration of NRZ encoded data signal 120.

The NRZ encoded data signal 120 and the RZ pulse signal 140 are each fed to a data modulator 150. Data modulator 150 multiplies the RZ pulse signal 140 by the NRZ encoded data signal 120, and outputs an RZ encoded data signal 160 that encodes the same data that is encoded in the NRZ encoded data signal. In effect, data modulator 150 allows RZ pulses of the RZ pulse signal 140 to pass through when the NRZ encoded data signal is at logic state 1, and prevents RZ pulses of the RZ pulse signal 140 from passing through when the NRZ encoded data signal is at logic state 0. Thus, in FIG. 1, RZ pulses 142, 146 and 148 pass through the modulator and RZ pulse 144 is prevented from passing through the modulator. The RZ encoded data signal 160 may then be transmitted through an optical fiber or other transmission medium or utilized in another application.

Proper operation of apparatus 100 depends on having a correct time alignment between the NRZ encoded data signal 120 and the RZ pulse signal 140. If the two signals are not in correct time-alignment, the quality of the RZ encoded data signal 160 is disturbed. This can be understood with reference to FIGS. 2 and 3 that schematically illustrate correct and anti-correct time alignments, respectively, between NRZ encoded data signal 120 and RZ pulse signal 140, and the RZ encoded data signals 160 that result from the correct and anti-correct time alignments.

In FIG. 2, RZ pulse signal 140 is precisely time-aligned with NRZ encoded data signal 120. In particular, RZ pulse 142 is precisely time-aligned with data signal portion 122 of NRZ encoded data signal, RZ pulse 144 is precisely time-aligned with data signal portion 124, and RZ pulses 146 and 148 are precisely time-aligned with the first and second halves of data signal portion 126. Because the signals 120 and 140 are in proper time alignment, the modulator 150 (FIG. 1) allows RZ pulses 142, 146 and 148 to pass through since those pulses are aligned with NRZ encoded data signal portions 122 and 126 that are at logic state 1. However, the modulator 150 will not allow RZ pulse 144 to pass through because that pulse is aligned with NRZ encoded data signal portion 124 that is at logic state 0. As a result, RZ encoded data signal 160 is generated that includes RZ pulses 142, 146 and 148, but no pulse corresponding to RZ pulse 144. RZ encoded data signal 160, therefore, also represents the binary data pattern "1011".

In FIG. 3, the NRZ encoded data signal 120 and the RZ pulse signal 140 are in anti-correct time-alignment, i.e., the signals are misaligned to a maximum extent. Thus, in FIG. 3, RZ pulse 142 is aligned with the transition between an NRZ signal portion at logic state 0 and signal portion 122 at logic state 1, RZ pulse 144 is aligned with the transition between signal pulses 122 and 124, and RZ pulse 146 is aligned with the transition between signal portions 124 and 126. RZ pulse 148, is time-aligned between the first and second halves of NRZ signal portion 126. As is apparent from FIG. 3, because RZ pulses 142, 144 and 146 are only partially aligned with NRZ encoded data signal portions at logic state 1, only portions of RZ pulses 142, 144 and 146 are passed by the modulator 150, resulting in pulses 162, 164 and 166 of reduced level. Although RZ pulse 148 is aligned between the first and second halves of NRZ encoded data signal portion 126; both halves are at logic state 1 resulting in pulse 148 being fully passed by modulator 150.

Because of the anti-correct time alignment between signals 120 and 140, RZ encoded data signal 160, as a whole, is degraded. If the signals 120 and 140 are incorrectly time-aligned to a lesser extent than illustrated in FIG. 3; the quality of RZ encoded data signal 160 will still be degraded, although to a lesser extent.

Referring back to FIG. 1, correct time alignment between the NRZ encoded data signal 120 and the RZ pulse signal 140 is established and maintained by a clock oscillator 170 that functions as a master clock for both the data modulator 150 and the RZ pulse generator 130. More particularly, clock oscillator 170 provides a Clock 1 signal for clocking the RZ pulse generator 130 and a Clock 2 signal for clocking the data modulator 150. Clock 1 signal and Clock 2 signal are at the same frequency inasmuch as they originate from the same clock oscillator 170; however, a time delay is established between the signals by controllable delay generator 180 positioned between the clock oscillator 170 and the RZ pulse generator 130. The controllable delay generator 180 is operable to adjust the timing of the RZ pulse generator 130 so that the RZ pulse signal generated thereby will be in correct time alignment with the NRZ encoded data signal.

It is a relatively straightforward process for a human operator to observe correct and anti-correct states on a suitable time-domain display instrument such an oscilloscope. It is also relatively straightforward to adjust the time delay introduced by the time delay oscillator to provide a correct time alignment. For example, in a conventional time-alignment procedure, an operator adjusts the timing between the NRZ encoded data signal and the RZ pulse signal while viewing the alignment state on the oscilloscope. When an anti-correct state is noted, the delay is then swept through the correct state to the next anti-correct state. The delay is then returned to a point halfway between the two anti-correct states, resulting in the signals being correctly time-aligned.

The above-described conventional procedure for time-aligning the signals requires human intervention; and, accordingly, is not suitable for automated procedures. Also, in some applications, observation of the signals in the time-domain is not feasible such that manual alignment is not possible. Therefore, there is a need for a method and apparatus for accurately time-aligning an NRZ encoded data signal and an RZ pulse signal in a fully automated manner that does not require human intervention.

SUMMARY OF THE INVENTION

The present invention provides a method and apparatus for reliably time-aligning digital signals in an automated manner that does not require human intervention.

A method for time-aligning first and second signals according to the present invention comprises modulating the second signal by the first signal to provide a third signal, and determining frequency components of the third signal, the frequency components being indicative of time alignment between the first and second signals.

According to an embodiment of the present invention, the first signal comprises an NRZ encoded data test signal in which data is encoded in an NRZ signal format, the second signal comprises an RZ pulse signal and the third signal comprises an RZ encoded data signal in which the data is encoded in an RZ signal format. It has been discovered that by modulating the RZ pulse signal by the NRZ encoded data test signal, the relative strength of the frequency components of the resulting RZ encoded data signal is indicative of whether the NRZ encoded data test signal and the RZ pulse signal are in a correct time alignment. In particular, if the fundamental frequency component of the resultant RZ encoded data signal is equal to the frequency of the RZ pulse signal, this indicates that the RZ pulse signal is incorrectly time-aligned with the NRZ encoded data signal; whereas, if the fundamental frequency component of the resultant RZ encoded data signal is equal to one-half the frequency of the RZ pulse signal, this indicates that that the RZ pulse signal and the NRZ encoded data test signal are in correct time alignment.

According to another embodiment of the invention, the NRZ encoded data test signal comprises a digital signal having a binary data pattern of "1010. . ", and the step of determining the frequency components of the RZ encoded data signal comprises filtering the RZ encoded data signal while sweeping the RZ pulse signal through a complete delay range. When the fundamental frequency of the RZ encoded data signal is equal to one-half the frequency of the RZ pulse signal, a strong signal will pass the filter; while when the fundamental frequency of the RZ encoded data signal is not equal to one-half the frequency of the RZ pulse signal, a weaker signal will pass the filter. When the NRZ encoded data signal and the RZ pulse signal are at an anti-correct timing state, the output of the filter will be at a minimum level. By detecting when the output of the filter is at a minimum level, the anti-correct timing states can be determined. The delay value is then set exactly between delay values indicative of anti-correct alignment states to provide the correct timing state.

According to another embodiment of the invention, the level of the signal passing the filter is determined by converting the signal to a DC voltage, and measuring the voltage level relative to a reference value using a voltmeter or other appropriate voltage measuring device.

The present invention is particularly suitable for converting a first optical data signal in which data is encoded in an NRZ signal format to a second optical data signal in which the data is encoded in an RZ signal format for effectively transmitting the data through an optical fiber or for other applications. The invention can, however, also be used in connection with any signal medium including, for example, electrical, optical, fluidic and mechanical signals. Furthermore, the invention provides embodiments with other features and advantages in addition to or in lieu of those discussed above. Many of these features and advantages are apparent from the description below with reference to the following drawings.

BRIEF DESCRIPTION OF THE DRAWINGS

FIG. 1 is a block diagram that schematically illustrates an apparatus for converting an NRZ encoded data signal to an RZ encoded data signal that is known in the prior art;

FIG. 2 is a diagram that schematically illustrates an NRZ encoded data signal and an RZ pulse signal that are in correct time alignment, and an RZ encoded data signal provided by modulating the RZ pulse signal with the NRZ encoded data signal;

FIG. 3 is a diagram that schematically illustrates an NRZ encoded data signal and an RZ pulse signal that are in anti-correct time alignment, and an RZ encoded data signal provided by modulating the RZ pulse signal with the NRZ encoded data signal;

FIG. 4 is a diagram that schematically illustrates an NRZ encoded data test signal and an RZ pulse signal that are in correct time alignment, and an RZ encoded data signal provided by modulating the RZ pulse signal with the NRZ encoded data test signal according to an embodiment of the present invention;

FIG. 5 is a diagram that schematically illustrates an NRZ encoded data test signal and an RZ pulse signal that are in anti-correct time alignment, and an RZ encoded data signal provided by modulating the RZ pulse signal with the NRZ encoded data test signal according to an embodiment of the present invention;

FIG. 6 is a block diagram of an apparatus for determining the strength of a frequency component of an RZ encoded data signal according to another embodiment of the present invention;

FIG. 7 is a graph that schematically illustrates the operation of the apparatus of FIG. 6;

DETAILED DESCRIPTION OF THE EXEMPLARY EMBODIMENTS OF THE INVENTION

Figure 8:
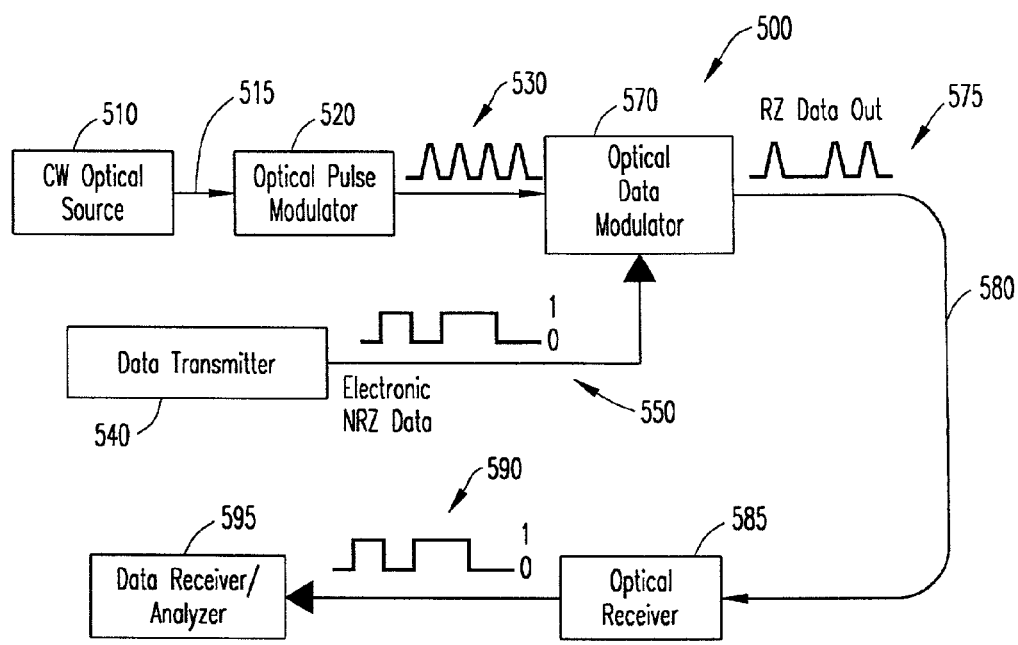
FIG. 8 is a block diagram that schematically illustrates an optical data communications system according to another embodiment of the present invention.

The present invention provides a method and apparatus for time aligning first and second signals, such as an NRZ encoded data signal and an RZ pulse signal, using a frequency domain analysis procedure that will allow the signals to be time aligned in a substantially automated manner without human intervention.

FIGS. 4 and 5 are diagrams that schematically illustrate an NRZ encoded data signal and an RZ pulse signal that are in correct time alignment and in anti-correct time alignment, respectively, and RZ encoded data signals provided by modulating the RZ pulse signal with the NRZ encoded data signal according to an embodiment of the present invention. The diagrams of FIGS. 4 and 5 are similar to the diagrams of FIGS. 2 and 3, however, in FIGS. 4 and 5; the NRZ encoded data signal comprises an NRZ encoded data test signal 200 having signal portions 202, 204, 206 and 208 of one bit duration each that alternate between logic state 1 and logic state 0, and thus represents the binary data pattern "1010...". RZ pulse signal 140 includes pulses 142, 144, 146 and 148, each of which have a time duration equal to one bit duration of NRZ encoded data test signal 200. In FIG. 4, RZ pulse signal 140 is in correct time alignment with the NRZ encoded data test signal 200 such that the peak of each RZ pulse 142, 144, 146 and 148 of signal 140 is aligned exactly with the center of a corresponding one of portions 202, 204, 206 and 208 of NRZ encoded data test signal 200. As a result, when the NRZ encoded data test signal and the RZ pulse signal are multiplied using, for example, the apparatus 100 of FIG. 1; RZ pulses 142 and 146 that are aligned with NRZ encoded data test signal portions 202 and 204 that are at logic state 1, will be passed by the modulator 150; while RZ pulses 144 and 148 that are aligned with NRZ encoded data test signal portions 202 and 206 that are at logic level 0 will not be permitted to pass. As a result, an RZ encoded data signal 230 having RZ pulses 232 and 234 only will be provided at the output of the modulator. Stated another way, the fundamental frequency (Fc) of the RZ data signal 230 will be one-half the frequency of the RZ pulse signal 140 (Fdata); i.e., Fc=½*Fdata.

On the other hand, if the time alignment between the NRZ encoded data test signal 200 and the RZ pulse signal 140 is anti-correct, as shown in FIG. 5, each of the pulses 142, 144, 146 and 148 of the RZ pulse signal 140, will be partially aligned with NRZ signal portions 202 or 206 at logic state 1, and partially aligned with NRZ signal portions 204 and 208 at logic state 0. As a result, when the RZ data signal 140 and the NRZ encoded data test signal 200 are multiplied, an RZ encoded data signal will be provided having pulses 242, 244, 246 and 248, each of which will be at an intermediate value. In other words, the frequency components of RZ data signal 240 will contain both frequencies Fdata and Fc=½*Fdata, with the component Fdata becoming weaker and the component Fc becoming stronger as the amount of misalignment is decreased.

Thus, as should be apparent from FIGS. 4 and 5, when the NRZ encoded data test signal and the RZ pulse signal are in correct time alignment, an RZ encoded data signal will result that always has a fundamental frequency of ½ Fdata. On the other hand, when the signals are not in correct time alignment, an RZ data signal will result in which the frequency component at ½ Fdata is reduced in amplitude. The present invention recognizes that this difference in signal strength of the ½ Fdata frequency component of the RZ encoded data signal can be used to determine when an NRZ encoded data signal and an RZ pulse signal are in correct time alignment.

FIG. 6 is a block diagram that schematically illustrates an apparatus for determining signal amplitude of the ½ Fdata frequency component of an RZ encoded data signal according to another embodiment of the present invention. The apparatus is generally designated by reference number 300 and comprises a filter 310 having a predetermined cutoff frequency. For example, in one embodiment of the invention, filter 310 comprises a low pass filter having a cut-off frequency of ½ Fdata. In other embodiments, the filter can comprise a high pass filter or a bandpass filter.

RZ encoded data signal 230 provided when RZ pulse signal 140 and NRZ encoded data test signal 200 are in correct time alignment, and RZ encoded data signal 240 provided when RZ pulse signal 140 and NRZ encoded data test signal 200 are in anti-correct alignment are also illustrated in FIG. 6. Since signal 230 has a frequency of ½ Fdata, it is allowed to pass through the filter. The output of the filter 310 is a sine wave signal 320 having a fundamental frequency of ½ Fdata. Sine wave 320 is then input to a detector 350, such as, for example, an RF detector, that converts the sine wave signal 320 to a DC voltage signal 330 that is at high level with respect to a reference voltage level 335. In other embodiments of the invention, detector 350 can comprise a peak detector, a square log detector or the like, and it is not intended to limit the invention to any particular type of detector.

RZ encoded data signal 240, however, has a reduced frequency component below the cut-off frequency of filter 310. Accordingly, signal 240 will essentially be blocked by the filter. In this regard, inasmuch as the null of the frequency component below the cut-off frequency is not perfect, a small component of the sine wave 320 will usually pass through the filter as represented by sine wave 340. This small component of the sine wave when detected by the RF detector will result in a low DC voltage level 345 that is only slightly greater than the reference voltage 335. When the NRZ encoded data test signal and the RZ pulse signal are intermediate a correct alignment and an anti-correct alignment, a DC voltage signal at an intermediate signal level will be provided at the output of the detector 350. Any appropriate voltage measuring device, such as a voltmeter, schematically represented by component 360 in FIG. 6, can be used to measure the voltage of the signal output from the detector 350.

FIG. 7 is a graph that schematically illustrates detected voltage plotted as a function of clock delay. The clock delay is represented along the x-axis and the detected voltage is represented along the y-axis. The controllable delay generator 150 of FIG. 1 is capable of being set at a range of delay settings between a minimum and a maximum delay setting. The delay generator is set to a first delay setting corresponding to a minimum delay setting. The DC voltage corresponding to the first delay setting is measured. In the following step, the controllable delay generator is adjusted to a second delay setting and a second DC voltage measurement is made. The process of adjusting the delay settings is continued until the controllable delay generator provides a maximum delay setting. The plotting of output voltage for each controllable delay setting will result in a graph such as shown in FIG. 7. As shown in FIG. 7, anti-correct time alignment states occur at locations 410 and 420, represented by points T1 and T2. The voltage values at points T1 and T2 correspond to a minimum voltage value measured by the voltmeter 360. Correct alignment states are represented by reference numbers 430, 440 and 450. The delay is adjusted until a zone of incorrect time alignment T1 represented by reference numeral 410 is located. Since T1 represents an anti-correct time alignment, the detected voltage corresponding to T1 is very low. Continuing with adjustment of the delay settings, a zone of correct time alignment Tc, designated by reference number 440, is detected. The detected voltage at Tc corresponds to a maximum voltage value. With further adjustments to the delay, another zone of anti-correct time alignment T2, designated by reference numeral 420 is located. The timing for the correct time alignment delay is then calculated as a time that lies midway between points T1 and T2. Specifically, the correct timing delay is calculated by the equation $$Tc = \frac{1}{2} * (T1 + T2)$$

where Tc is the correct timing state and T1 and T2 are the delay values corresponding to the anti-correct alignment points.

FIG. 8 is a block diagram that schematically illustrates an optical communications system according to another embodiment of the present invention with which the method and apparatus for time aligning first and second signals according to the present invention may be utilized. The communications system is generally designated by reference number 500 and includes a continuous wave optical source 510 for generating a light signal 515 having constant intensity. Light signal 515 enters an optical pulse modulator 520 that converts light signal 515 to a series of RZ light pulses 530, i.e., an RZ pulse signal. A data transmitter 540 produces an NRZ encoded data test signal 550 in the form of a test pattern "1010 . . . ". In an exemplary embodiment of the present invention, the data transmitter can be a transmitter of data from a telecommunications system. Alternatively, the data transmitter can comprise test equipment such as, for example, a bit error rate tester (BERT).

The NRZ data test pattern 550 and the RZ pulse signal 530 are input to an optical data modulator 570. The optical data modulator multiplies the NRZ encoded data test pattern 550 with the RZ pulse signal 530 and provides RZ data output signal 575. Correct time alignment of the signals 530 and 550 can be established using the apparatus of FIG. 6. The RZ encoded data signal 575 can then be transmitted through an optical fiber or another transmission medium 580 to an optical receiver 585. At the optical receiver, the RZ encoded optical signal can be reconverted to an NRZ encoded data signal 590 for use by a data receiver/analyzer 595 or the like. Reconversion of the RZ data signal to an NRZ encoded signal can be carried out by known procedures such as, for example, a clock data recovery procedure by which a clock is recovered from the incoming data. Alternatively, the time alignment procedure of the present invention can be utilized to recover the data.

Figure 9:
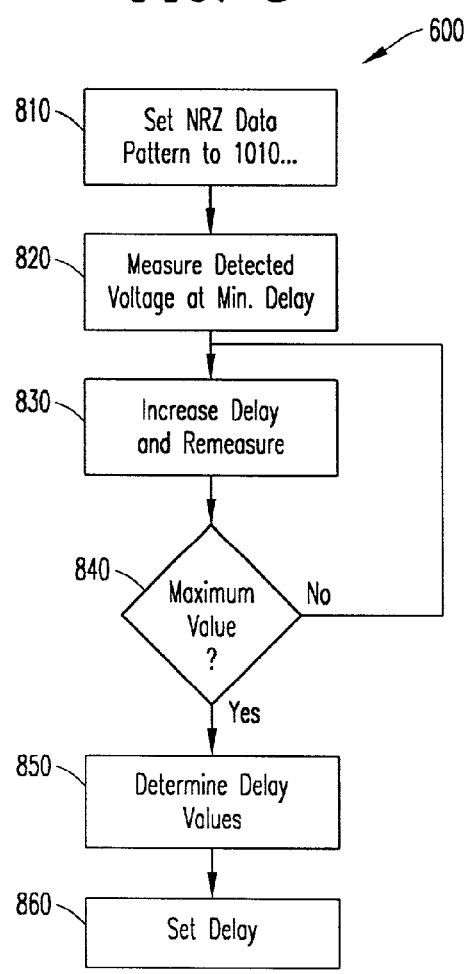
FIG. 9 is a flow chart illustrating steps of a method for time-aligning first and second signals according to another embodiment of the present invention.

FIG. 9 is a flowchart illustrating a method for time-aligning first and second signals according to another embodiment of the present invention.

Initially, the NRZ data generator 110 is set to generate an NRZ encoded data test signal having a binary data pattern "1010 . . . " (step 810). With clock delay at a minimum, the corresponding voltage of the RZ encoded data signal is then measured (step 820). If the clock delay has not exceeded the maximum delay value (No output of step 840), steps 820 and 830 are repeated until the clock delay exceeds the maximum delay value. When the clock delay value exceeds the maximum value (Yes output of step 840), the delay values corresponding to nulls T1 and T2 are determined (step 850). The correct time alignment is then achieved by setting the delay to Tc=½*(T1+T2) (step 860).

While what has been described constitutes exemplary embodiments of the invention, it should be recognized that the invention can be varied in numerous ways without departing from the scope thereof. Accordingly, it should be recognized that the invention should be limited only insofar as is required by the scope of the following claims.

I claim:

1. A method for time aligning first and second signals, comprising the steps of:
   modulating said second signal by said first signal to provide a third signal; and
   determining frequency component strengths of said third signal, said frequency component strengths being indicative of time alignment between said first signal and said second signal, wherein said step of determining frequency component strengths of said third signal comprises:
   filtering said third signal to provide a filtered signal while sweeping said second signal through a time delay; and
   detecting a level of said filtered signal, said level being indicative of time alignment between said first signal and said second signal, said step of detecting a level of said filtered signal comprises:
   first detecting when said filtered signal is at a minimum level during said sweeping, said minimum level occurring at a first time delay value;
   second detecting when said filtered signal is next at said minimum level during said sweeping, said next minimum level occurring at a second time delay value; and
   setting a time delay value for said second signal at a delay value between said first time delay value and said second time delay value;
   wherein said first signal comprises a data signal encoded in a predetermined bit pattern in a Non-Return-to-Zero signal format, said second signal comprises a Return-to-Zero pulse signal having a frequency equal to a data interval of said first signal, and said third signal comprises a data signal in which data is encoded in a Return-to Zero signal format.

2. The method according to claim 1, wherein said step of detecting the level of said filtered signal further comprises:
   converting said filtered signal to a DC voltage signal; and
   measuring a voltage level of said DC voltage signal.

3. The method according to claim 1, wherein said first and second detecting steps comprise converting said filtered signal to a DC voltage signal, and detecting the voltage level of said DC voltage signal during said sweeping.

4. The method according to claim 1, wherein said first signal and said second signal are in correct time alignment when a fundamental frequency of said third signal equals one-half the frequency of said second signal.

5. The method according to claim 1, wherein said step of filtering further comprises filtering said third signal with a low pass filter.

6. The method according to claim 1, wherein said first and second signals comprise optical signals.

7. An apparatus for time aligning a first signal and a second signal, said first signal being a Non-Return-to-Zero data test signal and said second signal being a Return-to-Zero pulse signal, said apparatus comprising:

a modulator for modulating said second signal with said first signal to provide a third signal;

a filter for filtering said third signal to provide a filtered signal, said filter filters said third signal while sweeping said second signal through a time delay range; and a detector for detecting a fundamental frequency of said third signal, said detector detecting when said filtered signal is at a minimum level at a first delay value, said detector further detecting when said filtered signal is next at said minimum level at a second delay value, said detector further providing a delay value for said second signal being at a time delay value between said first time delay value and said second time delay value.

* * * * *